United States Patent [19]

Simon et al.

[11] Patent Number: 5,482,169
[45] Date of Patent: Jan. 9, 1996

[54] CABLE LIFTING DEVICE FOR HANDLING HEAVY LOADS WITHIN A TIGHT SHIELDED ENCLOSURE

[75] Inventors: Alain Simon, Paris; Bernard Dirollo, Pont St. Esprit, both of France

[73] Assignee: Commissariat a l'Energie Atomique, Paris, France

[21] Appl. No.: 368,052

[22] Filed: Jan. 3, 1995

Related U.S. Application Data

[63] Continuation of Ser. No. 61,057, May 14, 1993, abandoned.

[30] Foreign Application Priority Data

May 15, 1992 [FR] France .................................. 92 05942

[51] Int. Cl.⁶ .................................................. B25J 11/00
[52] U.S. Cl. ........................ 212/245; 212/283; 376/260; 414/21; 414/146
[58] Field of Search .................................... 376/287, 260; 414/3, 8, 21, 146; 212/243, 129, 283; 294/906; 177/147

[56] References Cited

U.S. PATENT DOCUMENTS

| | | | |
|---|---|---|---|
| 3,135,396 | 6/1964 | Grainger | 414/8 |
| 3,164,267 | 1/1965 | Jelatis et al. | 414/8 |
| 3,272,347 | 9/1966 | Lemelson | 212/129 |
| 3,341,423 | 9/1967 | Costes | 414/146 |
| 3,425,569 | 2/1969 | Haaker | 414/8 |
| 3,432,047 | 3/1969 | Vautrey | 414/146 |
| 3,967,741 | 7/1976 | Hoffmeister | 414/146 |
| 4,094,369 | 6/1978 | Blanc et al. | 177/147 |
| 4,696,612 | 9/1987 | Germond et al. | 414/8 |
| 4,822,238 | 4/1989 | Kwech | 414/3 |
| 4,858,890 | 8/1989 | Fowler et al. . | |
| 4,904,141 | 2/1990 | Contin | 414/8 |
| 5,141,378 | 8/1992 | Lestournel et al. | 376/260 |

FOREIGN PATENT DOCUMENTS

| | | | |
|---|---|---|---|
| 1406473 | 6/1965 | France . | |
| 2610562 | 8/1988 | France | 414/3 |
| 370575 | 3/1923 | Germany . | |
| 2014455 | 10/1970 | Germany . | |
| 2236976 | 4/1991 | United Kingdom . | |

*Primary Examiner*—Michael S. Huppert
*Assistant Examiner*—Thomas J. Brahan
*Attorney, Agent, or Firm*—Oblon, Spivak, McClelland, Maier & Neustadt

[57] ABSTRACT

A lifting device makes it possible to manipulate loads within a tight enclosure with an operator remaining outside the enclosure. The device includes a main arm fitted so as to slide in an opening of a wall surrounding the enclosure, by way of a hose or sleeve. An articulated beam is mounted so as to pivot at the end of the main arm. This pivoting action can be controlled by two parallel rods mounted within the arm. The device is applicable to, for example, the handling of heavy loads within tight enclosures in the nuclear field.

4 Claims, 2 Drawing Sheets

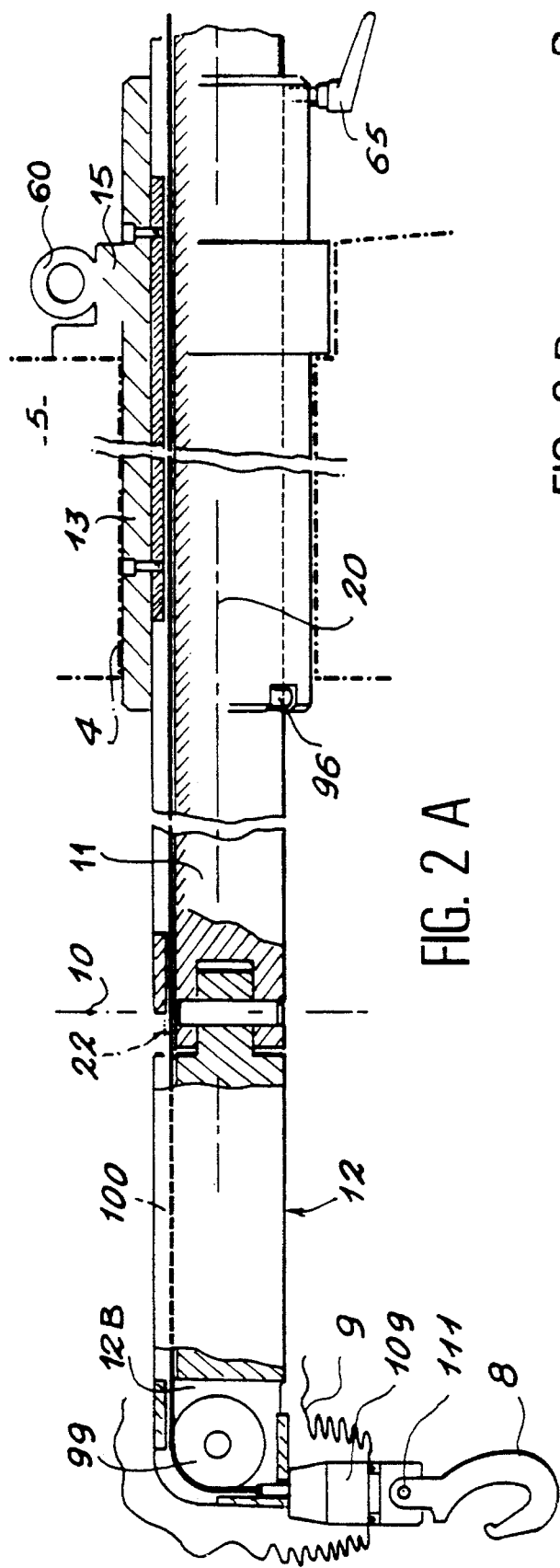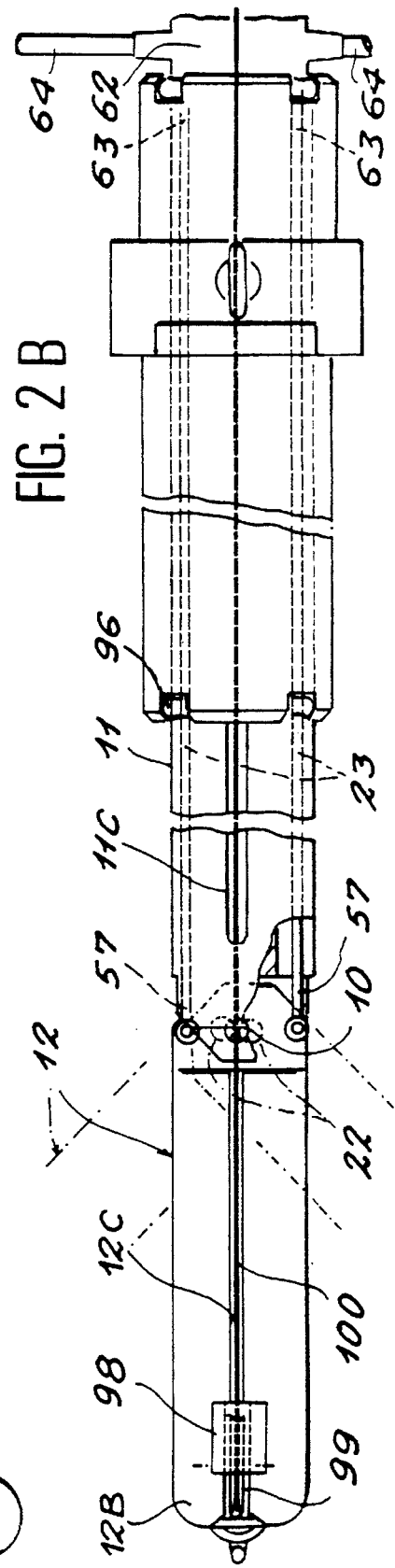

CABLE LIFTING DEVICE FOR HANDLING HEAVY LOADS WITHIN A TIGHT SHIELDED ENCLOSURE

This application is a continuation of application Ser. No. 08/061,057, filed on May 14, 1993, now abandoned.

FIELD OF THE INVENTION

The invention relates to the handling or manipulation of heavy loads located within an enclosure which is inaccessible to operators, such as a tight cell or chamber used in the nuclear field for confining radioactive materials. Within such an enclosure, chamber or tight cell, handling operations have to be carried out permanently in accordance with the working requirements on products, equipment, accessories and the like, namely for research on and developing processes, production or simply for maintenance purposes. These manipulations must take place completely safely, i.e. without breaking the seal and through biological screens known as shields, which are made from different materials (cast metal, lead, steel, concrete, glass, etc.) and having variable thicknesses (from a few centimeters to more than 1 meter), dimensioned on a case by case basis in order to ensure a protection for operators against the harmful effect of neutron, gamma, beta and alpha radiation.

DISCUSSION OF THE PRIOR ART

In order to carry out such manipulations fully protected against contamination and radiation, use is generally made of telemanipulators, which are mechanical apparatuses which traverse the walls of these enclosures, chambers or cells, as well as the associated radiological protections, in a tight manner and without giving rise to radiation leaks.

These telemanipulators are often of the master-slave type, i.e. they are controlled by means of an operator located outside the shielded enclosure. Existing telemanipulators used in this field are complex and relatively fragile equipment generally having numerous degrees of freedom, so as to maintain, for a small load, a very high handling precision level, comparable to that of the human hand. This precision with respect to the movements is obtained to the detriment of the load. Thus, in using such telemanipulators it is only possible to raise loads of a few kilograms (3 to 25 kg). For raising heavier loads within a tight enclosure, it is necessary to have a pulley block especially positioned within the enclosure. This type of pulley block is often installed on an overhead crane or derrick bearing on the structure of the chamber or cell, which in the case of existing enclosures limits its capacity to 50 to 100 kg.

The aim of the invention is to obviate this disadvantage by proposing a lifting device which can be fitted into one of the recesses and openings provided initially for passing through the biological protection and tight enclosure by telemanipulators of the type described hereinbefore, or possibly in a reservation of the same type provided for this purpose when designing the cell.

SUMMARY OF THE INVENTION

Therefore the main object of the invention is a cable lifting device for handling loads within a tight, shielded enclosure, said device comprising a horizontal carrier structure at the end of which is located a beam around which passes a lifting cable at the end of which there is an object gripping means, rotating means for pulling or allowing to descend the lifting cable and a control system.

According to the invention, the device incorporates a passage hose or sleeve in which the horizontal carrier structure is mounted in sliding manner and whose outer shape corresponds with the inner shape of a hole existing in the enclosure shield normally serving to receive another apparatus, such as a telemanipulator, or which is provided for this purpose when the enclosure is designed.

According to the invention the horizontal carrier structure is constituted by a main arm mounted so as to slide in the hose and whose first end is located in the enclosure, an articulated beam fitted by a first end on the main arm and pivoting about a vertical axis and at a second end of which is installed the pulley and the control system for pivoting the beam.

BRIEF DESCRIPTION OF THE DRAWINGS

FIGS. 2A and 2B illustrate the construction of the lifting device of the present invention.

DETAILED DESCRIPTION OF THE PREFERRED EMBODIMENT

Figure 1:
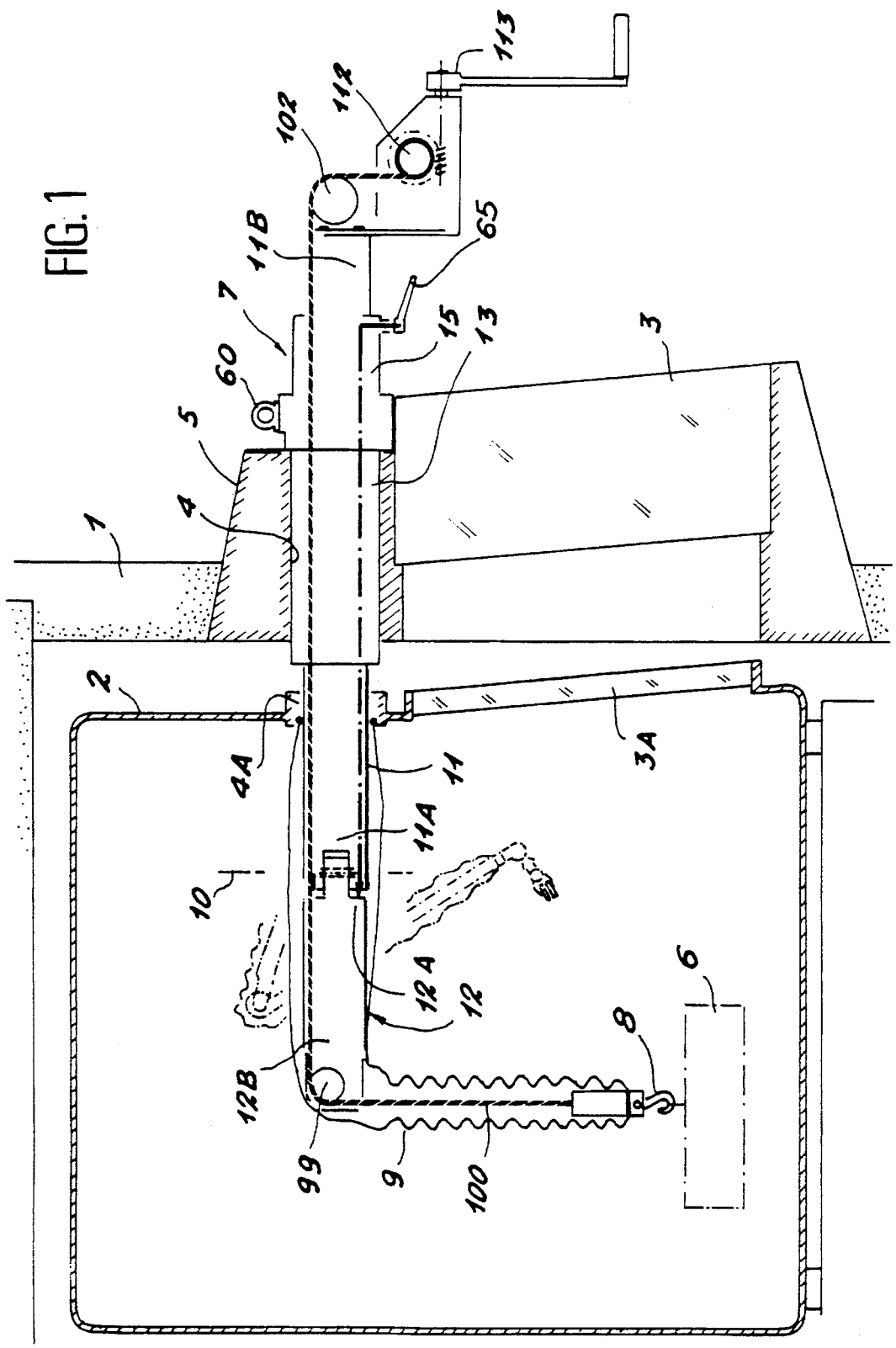
FIG. 1 illustrates elements of the lifting device of the present invention.

The control system noted above preferably comprises two rods mounted in the main arm, which are parallel and pass along the main arm in order to form a deformable parallelogram, a first end of each rod being fitted in articulated manner to the first end of the articulated beam on either side of which is provided a viewing window 3 for operators located outside the enclosure 2. This frame also has a passage hole 4 for the device 7 according to the invention, as well as for other equipment such as telemanipulators.

Note should be taken of the existence of a metal enclosure 2, which must also have a viewing means in the form of a window 3A or a television system and a corresponding hole 4A.

Therefore the lifting device 7 according to the invention must be placed within the hole 4 of the wall frame 5 in place of a telemanipulator previously located there and being operational within the tight enclosure 2 or in an identical hole provided for this purpose when designing the enclosure.

The lifting device according to the invention must have a cross-section corresponding to the internal shape of the hole 4 of the wall frame 5 and which is generally round.

With regards to the sealing of the system, it is pointed out that the telemanipulators used within such enclosures are surrounded by an elastic protective sleeve 9. During the withdrawal of such a telemanipulator, the sleeve 9 remains within the tight enclosure 2. During the putting into place of the lifting device 7 according to the invention, the latter is equipped with a new protective sleeve 9 and a sealing system on an ejectable ring. This putting into place brings about the release of the old protective sleeve 9, which drops into the enclosure 2.

Thus, in known manner, this system e.g. comprises a support ring, an enclosure ring, and mobilizing ring and a lip seal. During the putting into place of the lifting device according to the invention, the old protective sleeve is forced back into the interior of the enclosure by said system and by the new protective sleeve 9, which takes the place of the old one. It is pointed out that such a sealing system is already described in FR-A-1 484 712.

In order to ensure both the lifting and the manipulation of the loads 6 within the enclosure 2, the lifting device according to the invention must have within the sane several degrees of freedom at the end of its cable 100 and in particular at its gripping hook 8. Therefore means are provided for making the device 7 slide horizontally through the enclosure 2 and the shield 1 and preferably to pivot the gripping hook 8 of the cable 100 about a vertical pivoting axis 10.

FIG. 1 shows the main elements of the lifting device. They are mainly constituted by a horizontal carrier structure at one end of which is mounted in rotary manner a pulley 99, about which passes the lifting cable 100, whose end carries a gripping means, such as the gripping hook 8. At the other end of the carrier structure are located rotating means diagrammatically illustrated by a return pulley 102 and a handling crank 113. According to the invention, the horizontal carrier structure comprises a passage hose or sleeve 13 in which it is installed in sliding manner. The hose 13 is fixed to the wall frame 5 of the shield 1. Thus, the horizontal carrier structure can slide horizontally within the tight enclosure 2.

The preferred construction of the lifting device according to the invention is shown in FIGS. 2A and 2B. FIG. 2A shows certain elements to which reference has already been made, such as the gripping hook 8, the cable 100, the pulley 99 mounted so as to rotate about a horizontal axis, the wall frame 5 and the base sleeve 13.

The wall frame 5 has a hole 4 with a predetermined diameter and corresponding to the previously installed equipment, namely a conventional telemanipulator, the passage hose 13 having an external diameter corresponding to said diameter, so as to be locatable therein and fixable in a tight manner. It is possible to use for this purpose a flange 15 and not shown fixing screws for fixing the flange 15 in the wall frame. This flange 15 can be completed by a lifting ring 60 for facilitating the transportation and handling of the lifting device, during its introduction and extraction, e.g. by means of a travelling crane.

The horizontal carrier structure essentially comprises a main arm 11 slidingly mounted within the passage hose 13 and an articulated beam 12. The latter is mounted so as to pivot by a first end 12A about a vertical axis 10 at a first end 11A of the main arm 11. For this purpose the first end 11A of the main arm is machined in the form of a female member, thus receiving the first end 12A of the articulated beam machined in the form of a male member. Thus, the pulley 99 describes a circular arc about the vertical axis 10 when the articulated beam 12 pivots. In the same way, the gripping hook 8 also describes the circular arc. It is therefore possible for the latter to cover most of the surface on the bottom of the tight enclosure, as a result of the combination of this pivoting movement about the vertical axis 10 and the horizontal translatory movement in the passage hose 13 along the horizontal axis 20. Thus, the pulley 99 is installed at the second end 12B of the articulated beam 12.

As shown in FIG. 2B, the cable 100 is placed in the articulated beam 12 within a groove 12C and in the main arm 11 within a groove 11C. A first fixing part 98 is placed at the second end 12B of the articulated beam 12 in order to keep the cable 100 in the groove of the pulley 99, no matter what the movements of the articulated beam 12 and the charges suspended on the cable 100. In the same way, two guide pulleys 22 are fixed to the first end 11A of the main beam 11 level with the vertical pivoting axis 10.

The sliding movement of the main arm 11 in the passage hose 13 can be carried out by means of several rollers 96 mounted at each end of the hose 13. Therefore the rollers have rotation axes orthogonal to the horizontal sliding axis 20. Thus, it is possible to provide six rollers 96 at each end of the passage hose 13. Correspondingly the main arm 11 has bearings on which can roll the rollers 96. To enable the articulated beam 12 to pivot, it is necessary to use transmission elements of the control system, because the articulated beam 12 is located within the tight enclosure, whereas any operator is located outside the same. A special construction of these transmission elements can be mainly constituted by two reds 23 positioned longitudinally within the main arm 11 and parallel to one another. One of their first ends 57 is mounted so as to pivot at the first end 12A of the articulated beam 12 on either side of the pivoting axis 10. A second end 63 is fitted to a control system 62. The control system 62 of the rods 23 is illustrated by two handles 64 making it possible to move the two rods 23 in two opposite directions. Thus, the two rods 23 together with the first end 12A of the articulated beam 12 and the control system 62, form a deformable parallelogram.

The gripping hook 8 is fixed to the cable 100 by means of a pin 111 on a base 109 fixed to the protective sleeve 9. When the cable 100 is pulled to the maximum, the gripping hook 8 and the base 109 pivot into a position close to the horizontal remaining inscribed in the external shape of the horizontal carrier structure, thus permitting the introduction of the lifting device according to the invention into the interior of the enclosure by means of the hole 4 of the wall frame 5.

For the ejection of the protective sleeve 9, its disconnection and that of the base 109 and the hook 8 takes place in a known, conventional manner, using a tilting link. It is therefore possible on withdrawing the lifting device according to the invention from the hole 4, to release the three elements within the cell. The known device making it possible to ensure the necessary sealing is an ejectable ring-equipped sealing system. In such a system, all the elements ensuring the sealing of the apparatus and which have previously been installed are consequently ejected within the tight enclosure, displaced by the same sealing elements of the new instrument which is to take the place of the old one.

On returning to FIG. 1, the first rotating means making it possible to pull or lower the cable are diagrammatically represented by the crank 113. It is also possible to use a motorized hoist, as well as a toothed wheel/screw reduction system. It is also possible to use a dynamometer shaft 112 about which passes the cable 100 in order to permit the reading off of the weight of the load suspended on the cable 100. This dynamometer shaft 112 also makes it possible to bring about a safety stoppage of the motor system of the cable 100 with respect to a given maximum load.

A screw-nut system illustrated by the handle 65 makes it possible to lock the main arm 11 within the passage hose 13 in order to lock the complete horizontal carrier structure in a given longitudinal position.

It was stated hereinbefore that the preferred shape of the passage sleeve 13 is circular. It is formed by a tube, whose external profile conforms with that of the passage holes 4 of wall frames 5 for standard telemanipulators. The bearing surface of the hose 13 on the main arm 11 has an adequate length to permit the handling of heavy loads at the end of the horizontal carrier structure.

The present description has only related to an exemplified embodiment. Thus, the control members can be of a different type. For example, the rods 23 can be replaced by a closed loop formed by a chain or a belt and a pinion. It is therefore possible to obtain a greater pivoting of the articulated beam. In the same way, the cable 100 can be replaced by a band chain allowing a spiral winding. Consideration can also be given to the use of a pulley block, particularly at the base 109.

The screw/locking nut system 65 can be replaced by a rack/pinion system. It is also possible to ensure different movements of loads placed within the tight enclosure over a relatively large intervention zone from a fixed passage symbolized by a hole 4 in the wall frame 5 provided beforehand for a conventional telemanipulator.

This device makes it possible to handle heavy loads, which can reach several hundred kg, without having any influence on the structure of the confinement enclosure in view of the fact that the reaction forces applied to the apparatus are entirely taken up by the structure of the shield or wall surrounding the tight enclosure. Thus, in place of a conventional telemanipulator or in a reservation possibly provided for this purpose, is positioned a special lifting device for instantaneously carrying out the lifting and displacement of heavy loads within the tight enclosure.

We claim:

1. A cable lifting device for handling loads within a tight, shielded enclosure, the lifting device comprising:

a horizontal carrier structure having a pulley which is located at an end of the horizontal carrier structure;

a lifting cable which passes around said pulley, an end of said lifting cable comprising a base and an object gripping means, said object gripping means being pivotally mounted on said base through a horizontal pin;

rotating means for pulling or lowering the lifting cable;

a control system for controlling a movement of the horizontal carrier structure; and a passage hose in which the horizontal carrier structure is slidably mounted, wherein said passage hose is adapted to be located within a hole of a shielded enclosure, and an external shape of said passage hose corresponds with an internal shape of the hole, wherein a pulling of said cable by said rotating means to a maximum upward position causes the object gripping means and the base to be substantially horizontally positioned, thereby permitting the lifting device to be fittable in the hole of the shielded enclosure;

wherein said horizontal carrier structure comprises:

a horizontally extending main arm and a horizontally extending articulated beam, said main arm being slidably mounted in the passage hose, a first end of said main arm being located at the shielded enclosure, a second end of said main arm being pivotally attached to a first end of said articulated beam such that said articulated beam is pivotable about a vertical pivoting axes, wherein said control system controls a pivoting movement of said articulated beam about said vertical pivoting axis, said pulley being fitted on a second end of said articulated beam;

wherein guide rollers are mounted so as to be freely rotatable in said passage hose and on a periphery of said main arm to permit the sliding of the horizontal carrier structure with respect to said passage hose, and the control system comprises two rods longitudinally positioned within the main arm, said two rods being parallel to one another so as to form a parallelogram, a first end of each of said rods being fitted in an articulated manner to the first end of the articulated beam on either side of the pivoting axis, and a second end of each of said rods being fitted to the control system; and wherein said rotating means act on the cable by means of a dynamometer shaft in order to read off a weight of a load suspended on the cable.

2. A lifting device according to claim 1, further comprising a screw/nut locking system for locking in translation the main arm in the passage hose.

3. A lifting device according to claim 1, further comprising a sealing system having an ejectable ring.

4. A cable lifting device for handling loads within a tight, shielded enclosure, the lifting device comprising:

a horizontal carrier structure having a pulley which is located at an end of the horizontal carrier structure;

a lifting cable which passes around said pulley, an end of said lifting cable comprising a base and an object gripping means, said object gripping means being pivotally mounted on said base through a horizontal pin;

rotating means for pulling or lowering the lifting cable;

a control system for controlling a movement of the horizontal carrier structure; and a passage hose in which the horizontal carrier structure is slidably mounted, wherein said passage hose is adapted to be located within a hole of a shielded enclosure, and an external shape of said passage hose corresponds with an internal shape of the hole, wherein a pulling of said cable by said rotating means to a maximum upward position causes the object gripping means and the base to be substantially horizontally positioned, thereby permitting the lifting device to be fittable in the hole of the shielded enclosure;

wherein said horizontal carrier structure comprises:

a horizontally extending main arm and a horizontally extending articulated beam, said main arm being slidably mounted in the passage hose, a first end of said main arm being located at the shielded enclosure, a second end of said main arm being pivotally attached to a first end of said articulated beam such that said articulated beam is pivotable about a vertical pivoting axes, wherein said control system controls a pivoting movement of said articulated beam about said vertical pivoting axis, said pulley being fitted on a second end of said articulated beam;

wherein guide rollers are mounted so as to be freely rotatable in said passage hose and on a periphery of said main arm to permit the sliding of the horizontal carrier structure with respect to said passage hose, and the control system comprises two rods longitudinally positioned within the main arm and positioned on each side of a portion of said lifting cable which is positioned adjacent to the main arm, said two rods being parallel to said portion of the lifting cable and being parallel to one another so as to form a parallelogram, a first end of each of said rods being fitted in an articulated manner to the first end of the articulated beam on either side of the pivoting axis, and a second end of each of said rods being fitted to the control system; and wherein said rotating means act on the cable by means of a dynamometer shaft in order to read off a weight of a load suspended on the cable.

\* \* \* \* \*